BEST AVAILABLE COPY
J. R. Steer.
Cotton Bale Tie.
No. 207. (Ad.) Patented Oct. 26. 1858.
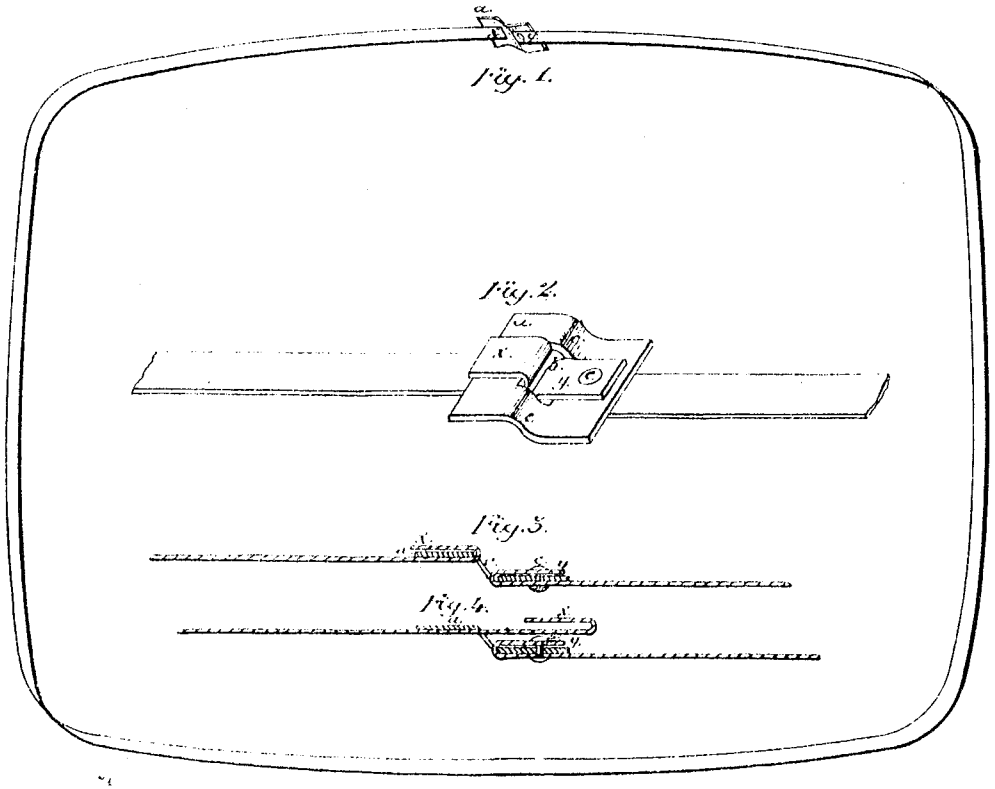
PHOTOLITHOGRAPHED AT THE PHOTOGRAPHER, WASHINGTON, D.C.